United States Patent
Chen

(10) Patent No.: US 11,490,310 B2
(45) Date of Patent: Nov. 1, 2022

(54) COMMUNICATION METHOD, ELECTRONIC DEVICE, AND COMMUNICATION SYSTEM

(71) Applicant: Lenovo (Beijing) Co., Ltd., Beijing (CN)

(72) Inventor: Rui Chen, Beijing (CN)

(73) Assignee: LENOVO (BEIJING) CO., LTD., Beijing (CN)

( * ) Notice: Subject to any disclaimer, the term of this patent is extended or adjusted under 35 U.S.C. 154(b) by 0 days.

(21) Appl. No.: 16/566,073

(22) Filed: Sep. 10, 2019

(65) Prior Publication Data

US 2020/0084685 A1 Mar. 12, 2020

(30) Foreign Application Priority Data

Sep. 10, 2018 (CN) .......................... 201811050373.4

(51) Int. Cl.
*H04W 36/28* (2009.01)
*H04W 40/36* (2009.01)
*H04W 36/16* (2009.01)
*H04W 36/00* (2009.01)
*H04W 36/30* (2009.01)
*H04W 40/24* (2009.01)

(52) U.S. Cl.
CPC ..... *H04W 36/165* (2013.01); *H04W 36/0072* (2013.01); *H04W 36/0083* (2013.01); *H04W 36/28* (2013.01); *H04W 36/30* (2013.01); *H04W 40/246* (2013.01); *H04W 40/248* (2013.01); *H04W 40/36* (2013.01)

(58) Field of Classification Search
CPC ......... H04W 36/0072; H04W 36/0083; H04W 36/18; H04W 36/22; H04W 36/30; H04W 36/165; H04W 40/36; H04W 40/248; H04W 28/0268; H04W 72/04
USPC .................. 370/216, 235, 400, 401, 329
See application file for complete search history.

(56) References Cited

U.S. PATENT DOCUMENTS

| 2009/0203388 | A1 | 8/2009 | Karaoguz | |
|---|---|---|---|---|
| 2010/0323715 | A1 | 12/2010 | Winters | |
| 2016/0057651 | A1* | 2/2016 | Backholm | H04W 28/0268 370/235 |
| 2017/0168480 | A1* | 6/2017 | Wanstedt | H04W 36/22 |
| 2018/0247544 | A1* | 8/2018 | Mustafic | H04W 36/0083 |
| 2018/0375568 | A1* | 12/2018 | De Rosa | H04W 72/04 |

(Continued)

FOREIGN PATENT DOCUMENTS

| CN | 105892486 A | 8/2016 |
|---|---|---|
| CN | 106921939 A | 7/2017 |
| CN | 107211409 A | 9/2017 |

(Continued)

*Primary Examiner* — Harun Chowdhury
(74) *Attorney, Agent, or Firm* — Anova Law Group, PLLC

(57) ABSTRACT

The present disclosure provides a communication method. The method includes acquiring route information of a route, which includes a destination; determining a first resource scheduling for a communication connection of a mobile device based on the route information of the route; determining whether the communication connection of the mobile device based on the first resource schedule requires more resources than a second alternative resource scheduling; and if so, using the second alternative resource scheduling for the communication connection of the mobile device.

15 Claims, 2 Drawing Sheets

```
┌─────────────────────────────────────────┐  101
│ Acquiring pre-estimated or pre-planned   │ /
│ movement route information              │
└─────────────────────────────────────────┘
                    │
                    ▼
┌─────────────────────────────────────────┐  102
│ Determining a resource scheduling of a   │ /
│ communication connection based on the    │
│ pre-estimated or pre-planned movement   │
│ route information                        │
└─────────────────────────────────────────┘
```

(56) References Cited

U.S. PATENT DOCUMENTS

2021/0103294 A1\* 4/2021 Mahkonen ........ H04W 28/0268

FOREIGN PATENT DOCUMENTS

| CN | 108064465 A | 5/2018 |
|---|---|---|
| EP | 3020633 A1 | 5/2016 |

\* cited by examiner

COMMUNICATION METHOD, ELECTRONIC DEVICE, AND COMMUNICATION SYSTEM

CROSS-REFERENCES TO RELATED APPLICATION

This application claims priority to Chinese Patent Application No. 201811050373.4, entitled "Electronic Device," filed on Sep. 10, 2018, the entire content of which is incorporated herein by reference.

FIELD OF TECHNOLOGY

The present disclosure relates to the field of communication, and more specifically, to a communication method, an electronic device, and a communication system.

BACKGROUND

In the process of frequently switching between base stations, establishing a communication connection with a stationary communication device, and establishing an ad hoc network with other devices, it is important to ensure a mobile device can smoothly switch between the base stations, establish a stable communication connection with the stationary communication device, and smoothly establish the ad hoc network with other devices, a stable and reliable network connection with large bandwidth and low delay. The conventional method of network switching takes a passive approach on the network side. When a terminal device is moving at a high speed, there is a high probability that a signal may attenuate during the base station switches, which may affect the network quality.

BRIEF SUMMARY OF THE DISCLOSURE

A first aspect of the present disclosure provides a communication method. The method includes acquiring route information of a route, which includes a destination; determining a first resource scheduling for a communication connection of a mobile device based on the route information of the route; determining whether the communication connection of the mobile device based on the first resource schedule requires more resources than a second alternative resource scheduling; and if so, using the second alternative resource scheduling for the communication connection of the mobile device.

A second aspect of the present disclosure provides an electronic device. The electronic device includes an acquisition module for acquiring movement route information; and a processing module for receiving a resource scheduling of a communication connection based on the movement route information. The processing module is configured to: determine a first resource scheduling for a communication connection based on the route information of the route; determine whether the communication connection requires more resources than a second alternative resource scheduling for the communication connection; and if so, use the second alternative resource scheduling for the communication connection.

A third aspect of the present disclosure provides a communication system. The communication system includes a first terminal configured to acquire route information of a route, which includes a destination; and a server communicatively coupled to the first terminal. The server is configured to determine a first resource scheduling for a communication connection based on the route information of the route.

Embodiments of the present disclosure may determine the resource scheduling of the communication connection more accurately and reasonably based on pre-estimated or pre-planned movement route information. Therefore, when the resource scheduling is performed, the resource scheduling may be appropriately provided based on the pre-estimated or pre-planned movement route information. As such, the scheduled resource for the communication connection may satisfy usage demand. Further, while saving its own resources, the communication system of the present disclosure may realize the rationalization of the resources of the communication connection, avoid the attenuation of the signal quality of the communication connection, and ensure the quality of the communication connection.

BRIEF DESCRIPTION OF THE DRAWINGS

For a more complete understanding of the present disclosure, and the advantages thereof, reference is now made to the following descriptions to be taken in conjunction with the accompanying drawings. The accompanying drawings in the following description show merely some embodiments of the present invention, and a person of ordinary skill in the art may still derive other drawings from these accompanying drawings without creative efforts.

DETAILED DESCRIPTION

Figure 1:
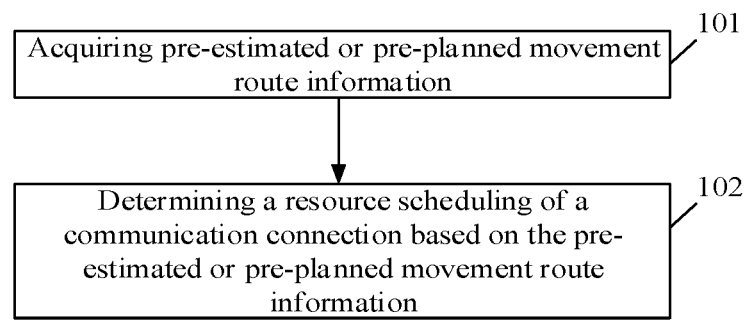
FIG. 1 is a flowchart of a communication method according to an embodiment of the present disclosure.

Hereinafter, aspects, features, and embodiments of the present disclosure will be described with reference to the accompanying drawings. It should be understood that such description is illustrative only but is not intended to limit the scope of the present disclosure. In addition, it will be understood by those skilled in the art that various modifications in form and details may be made therein without departing from the spirit and scope of the present disclosure.

It should be understood that although the present application has been described with reference the specific embodiments, many other equivalents of the present disclosure may be implemented by those skilled in the art with features of the claims of the present disclosure, and are therefore within the scope of protection defined herein.

Embodiments of the present disclosure are described hereinafter with reference to the accompanying drawings. However, it should be understood that these embodiments are merely examples of the present disclosure, which may be implemented in various ways. Well-known and/or repetitive functions or structures are not described in detail in order to clarify the true intent based on a user's operation history, and avoid unnecessary details that may obscure the present disclosure. Therefore, the specific structural and functional details of the present disclosure are not intended to be limiting, but are merely used as the representative basis of the claims to teach those skilled in the art to use the present disclosure in virtually any suitable and detailed structure.

In the specification, terms such as "in one embodiment", "in another embodiment", "in an additional embodiment", or "in other embodiments" may all refer to one or more the same or different embodiments of the present disclosure.

The present disclosure provides a communication method. The communication method may include: acquiring pre-estimated or pre-planned movement route information; and determining a resource scheduling of a communication connection based on the pre-estimated or pre-planned movement route information.

It can be seen from the above description that the communication method mentioned above may determine the resource scheduling of the communication connection more accurately and reasonably based on the pre-estimated or pre-planned movement route information. Therefore, when the resource scheduling is performed, the resource scheduling may be appropriately provided based on the pre-estimated or pre-planned movement route information. As such, the scheduled resource for the communication connection may satisfy the usage demand. Further, while saving its own resources, the communication method of the present disclosure may realize the rationalization of the resources of the communication connection, avoid the attenuation of the signal quality of the communication connection, and ensure the quality of the communication connection.

In order to make the above technical solution more clear and comprehensive, the communication method mentioned above will be described in detail below with reference to the embodiments and the accompanying drawings.

As shown in FIG. 1, which is a flowchart of a communication method according to an embodiment of the present disclosure. The communication method is described in more detail below.

101, acquiring pre-estimated or pre-planned movement route information.

The movement route information may be a movement route of a corresponding target object, a travel route of a smart car, a movement route of a user riding a train (a high-speed train, a train, etc.), or a movement route of a user's onboarding a ship, etc. That is, the target object may be directed to a person or an object, such as a smart car or other smart devices, and is not explicitly defined herein. Further, the pre-estimated or pre-planned movement route information may be acquired by a terminal side or by a server side. For example, taking a user driving a vehicle as an example, after the user enters a destination, a specific movement route (e.g., the movement route information) may be determined by a navigation system. At this point, the vehicle that the user is driving may acquire the movement route, or the server side (such as a cloud) may acquire the movement route through a network, which is not explicitly defined herein.

102, determining a resource scheduling of a communication connection based on the pre-estimated or pre-planned movement route information. When the movement route information is acquired through the terminal side, the terminal side may determine the resource scheduling of the communication connection based on the pre-estimated or pre-planned movement route information. When the movement route information is acquired through the server side, the server side may determine the resource scheduling of the communication connection based on the pre-estimated or pre-planned movement route information.

In some embodiments, determining the resource scheduling of the communication connection may include determining a channel resource to be used or reserved; or determining a cell switch scheme. Similarly, determining the channel resource to be used or reserved; or determining the cell switch scheme may be performed on the terminal side or the server side. Determining the channel resource to be used may be determining the channel resource currently being used, which may include the frequency band currently being used. Determining the channel resource to be reserved a channel resource or a frequency band that may be pre-reserved, which may be switched to when the signal of the communication connected is degraded. As such, the attenuation of the signal quality of the communication connection may be avoided.

First, the communication method will be described below using the server side as an example. For example, in the process of driving a smart car from location A to location B, when the smart car leaves location A, a first frequency band may be used to communicate with a communication base station (or a control center). When the smart car passes location C, the interference of location C to the first frequency band may be strong. As such, the communication between the smart car and the communication base station (or the control center) may be affected. In order to prevent the interference from affecting the safety of the smart car, the smart car may switch the frequency band to a second frequency band to communicate with the communication base station (or the control center). In particular, a first processor on the smart car may control the switching of the frequency band. For example, a communication module of the smart car may be controlled to switch to the frequency band to the second frequency band and transmit a frequency band switching signal to the communication base station. As such, the communication base station may switch to the second frequency band based on the frequency band switching signal. Further, the second frequency band may be a communication channel reserved for the smart car when planning the drive from location A to location B in order to prevent the occurrence of communication quality deterioration or signal deterioration while driving.

Similarly, when the process mentioned above is performed on the server side, in the process of driving a smart car from location A to location B, the first frequency band may be used to communicate with the communication base station (or the control center). When location C generates a strong interference to the first frequency band, the server may transmit the frequency band switching signal to the smart car and the communication base station (or the control center) that may be communicating with the smart car. As such, frequency bands of the smart car and the communication base station may be both switched to the second frequency band, and the smart car may still communicate well with the communication base station (or the control center) in location C. In particular, detecting that location C has a relatively strong interference to the first frequency band may be achieved by disposing a sensor near location C. For example, after the specific movement route information is determined based on the pre-estimated or pre-planned movement route information, environment information of the corresponding locations on the movement route may be detected by the sensors disposed on the movement route, and the resource scheduling may be performed and adjusted based on the detected environment information. The disposed sensors may provide environmental data (e.g., signal interference data) in real time so that the terminal and/or the server may update the resource scheduling based on the provided data.

Correspondingly, in one embodiment, determining the cell switch scheme may be a scheme to determine a switch from one cell to another to avoid a situation in which the signal quality of the communication may be greatly attenuated during the cell switch. For example, it may be possible to disconnect the connection from the current communication cell before establishing a connection with the next communication cell; or, establish a connection with other communication cells before disconnecting the connection with the current communication cell while switching cell. Further, it may also be possible to compare which of the cells that may be communicated that have the best channel quality, directly connect to the cell with the best channel quality, and disconnect the connection with the current communication cell after the connection is established. The method mentioned above may be specifically determined based on the actual use cases. If it is not suitable to disconnect the current communication connection, it may be necessary to establish a connection with another cell before disconnecting the communication with the current cell. Further, if the communication may be disconnected for a short period of time without any affect, the communication with the current cell may be disconnected before establishing the communication with another cell. When establishing the communication with another cell, communication information communicated with the current cell may be transmitted to the cell to which the communication connection is to be established, thereby saving the time spent on the electronic process of the cell switching.

The following is an example of performing the process mentioned above on the terminal side. In one embodiment, the terminal side may detect current parameter information, adjust a corresponding module based on the current parameter information, and simultaneously transmit a first control instruction. As such, another terminal may make a corresponding adjustment based on the first control instruction. For example, a smart aircraft (for photographing, cruising, etc.) may be flying from location A to B. During the flight, the smart aircraft may be within the signal coverage of a first cell. When the smart aircraft continues to fly along a planned route, the smart aircraft may fly out of the signal coverage of the first cell. When the smart aircraft is about to fly out of the signal coverage of the first cell, the smart aircraft may compare the channel quality of other cells that it may be able to establish a communicate with first (the channel quality of the other cells may be obtained by a detecting device such as a sensor disposed in a corresponding cell), a second processor on the smart aircraft may be used to determine a cell with better channel quality from the other cells, such as a second cell, and a first control instruction for establishing a communication may be transmitted to the second cell, and the communication with the second cell may be established in advance. After the communication is successfully established, the communication with the current cell may be disconnected, and the cell switching may be realized, thereby avoiding the situation in which the signal quality of the communication may be greatly attenuated. Of course, in actual use, if the time it takes to perform the cell switching is extremely short, such as 0.01 second, which may not affect the current flight, it may be possible to disconnect the communication with the current cell first, and then establish the communication with another cell.

In one embodiment, when the process mentioned above is performed on the server side, the server may acquire the current parameter information of a first terminal, generate a second control instruction based on the current parameter information, and transmit the second control instruction to the first terminal and a second terminal. As such, the first terminal and the second terminal may be adjusted based on the second control instruction, and a communication connection may be realized. Using the smart aircraft flying from location A to location B as an example, when the smart aircraft is about to fly out of the signal coverage of the first cell, the server may begin to transmit the second control instruction to the smart aircraft and the second cell (the cell the aircraft is about to enter), thereby allowing the smart aircraft to establish a communication connection with the second cell in advance, and disconnecting the communication connection with the first cell. Similarly, if the time it takes to perform the cell switching is relatively short and the current flight may be not affected, it may be possible to disconnect the communication with the first cell first, and then establish the communication with the second cell. In particular, detecting that the smart aircraft is about to fly out of the first cell may be achieved by using an intelligent detecting device (such as a sensor or the like) disposed at a corresponding location of a flight path of the smart aircraft. After the intelligent detecting device determines that the smart aircraft is about to fly out of the first cell, the intelligent detecting device may also compare the channel quality of the cells of which the smart aircraft may establish a communication connection with based on the flight path (the pre-estimate or pre-planned movement route information), select a cell with better channel quality, and provide it to the server. Further, acquiring the position of the smart aircraft may be achieved by positioning the smart aircraft.

In some embodiments, determining the resource scheduling of the communication connection may further include: determining a communication device to be connected in a group of communication devices. Similarly, it may be possible to determine the communication device to be connected in the group of communication devices through the terminal side; and determine the communication device to be connected in the group of communication devices through the server side. In particular, the group of communication devices may provide a communication connection service, and the communication device may be an Internet of Thing (IoT) sensor disposed at any location of the movement route, a communication base station, a camera including a communication function, etc., as long as the communication device may be used to perform a communication connection.

The following is an example of performing the process mentioned above on the terminal side. In one embodiment, a smart car may be driving from location A to location B. When the smart car is at location A, a driving route to location B may be planned based on a navigation plan. A third processor on the smart car may acquire, based on the driving route, information of signal stations, IoT detecting devices, etc. the smart car may pass while moving along the driving route. The third processor may further pre-plan a communication device that may need to be connected during the drive. As such, when the smart car needs to establish a communication connection with the communication device that may need to be connected during the drive, a corresponding second connection instruction may be transmitted to the communication device that may need to be connected, and a communication connection with the smart car may be established after the communication device that may need to be connected receives the second connection instruction. Further, the smart car may transmit parameter information of the smart car through the communication device that may need to be connected. More specifically, if the smart car passes through a camera with a communication function (the camera including the communication function may be a pre-determined communication device that may need to be connected) during a drive, the smart car may generate the second connection instruction through the third processor and transmit the second connection instruction to the camera. After the connection is established, the parameter information corresponding to the smart car may be transmitted to the camera with the communication function, and the parameter information may be transmitted to the control center (or other corresponding devices that may need the parameter information) through the camera with the communication function. Of course, an IoT sensor or the like having a communication function may also be used, which is not specifically limited herein.

In one embodiment, when the process mentioned above is performed on the server side, the server may acquire the driving route from location A to location B planned by the smart car and acquire, based on the driving route, information of the signal station, the IoT detecting device, etc. the smart car may pass while moving along the driving route, and pre-plan the communication device that may need to be connected during the drive. As such, when the smart car needs to establish a communication connection with the communication device that may need to be connected, a corresponding second connection instruction may be transmitted to the communication device that may need to be connected and the smart car, and a communication connection with the smart car may be established after the communication device that may need to be connected and the smart car receive the second connection instruction. Further, the parameter information of the smart car may be acquired through the established connection with the communication device. More specifically, if the smart car passes through an IoT sensor (the IoT sensor may be a pre-determined communication device that may need to be connected) during the drive, the server may transmit the second connection instruction to the smart car and the IoT sensor. As such, the smart car and the IoT sensor may be connected, and the parameter information corresponding to the smart car may be acquired through the IoT sensor. In some embodiments, determining the resource scheduling of the communication connection may include: determining the resource scheduling of the communication connection based on one or more of an operational state of the communication device, an amount of information to be communicated, or an information priority level of the communication.

More specifically, the operational state of the communication device may include a power rating of the communication device, a load condition, etc. When the power rating of the communication device is relatively low or the load is heavy, the communication quality of the communication device may be affected. At this point, it may be necessary to determine whether it may be necessary to switch the communication device based on the operational state of the communication device to achieve better communication transmission. The following is an example of performing the process mentioned above on the terminal side. In one embodiment, when a smart car travels to a particular location, the traffic of a first communication device near the smart car may be abnormally heavy, which may cause the load of the first communication device to be heavy. If the smart car still chooses to communicate through the first communication device, the quality of the communication may be affected. When the situation mentioned above occurs, a fourth processor on the smart car may be used to acquire the operational state of the first communication device based on an IoT sensor, a communication sensor, etc. located at the particular location. When it is determined that the load of the first communication device may be heavy and the communication quality may be affected, a second communication device that may be relatively far (farther than the first communication device) but may have a better operational state (having sufficient power rating and good load condition to ensure the communication quality) may be acquired. Further, a first communication connection instruction may be transmitted to the second communication device to establish a communication connection with the second communication device, thereby ensuring communication quality between the smart car and the communication device. In addition, the operational state of the communication device may also be a corresponding configuration of the communication device. At this point, the fourth processor on the smart car may acquire the configuration of the communication device to be switched to through the IoT sensor, the communication sensor, etc., and determine the time it may take to switch the communication device based on the transmitted data parameters of the communication device before the switch. That is, a response time that the communication device to be switched may need in order to establish the communication connection with the transmission of the data parameters mentioned above may be determined, thereby allowing the route planning of the smart car.

In one embodiment, when the process mentioned above is performed on the server side, the server may acquire the operational state of the first communication device through the IoT sensor, the communication sensor, or the like located at the particular place. When it is determined that the load of the first communication device may be heavy and the communication quality may be affected, the second communication device that may be relatively far (farther than the first communication device) but may have better operational state (having sufficient power rating and good load condition to ensure the communication quality) may be acquired. Further, the first communication connection instruction may be transmitted to the second communication device to establish a communication connection with the second communication device, thereby ensuring communication quality between the smart car and the communication device. Correspondingly, the operational state of the communication device may also be a corresponding configuration of the communication device, such as certain hardware or software components configured on the device. The server may acquire the configuration of the communication device to be switched to through the IoT sensor, such as the communication sensor, etc., and determine the time it may take to switch the communication device based on the transmitted data parameters of the smart car and the communication device (the communication device that may have established a communication connection with the smart car at this moment) before the switch. That is, a response time that the communication device to be switched to may need in order to establish the communication connection with the transmission of the data parameters mentioned above between the smart car and the communication device to be switched to may be determined, thereby allowing the server to plan in advance.

Correspondingly, the amount of information to be communicated may be the amount of data that may need to be transmitted. The following is an example of performing the process mentioned above on the terminal side. In one embodiment, a smart aircraft may be communicating with a communication device. If the smart aircraft needs to transmit real-time data monitored during the flight and captured flight videos through the communication device in real time, the amount of data generated may be relatively large. At this point, when the smart aircraft needs to switch the communication device, a fifth processor on the smart aircraft may generate first notification information and transmit the first notification information to the communication device to be switched to. As such, the communication device to be switched to may be aware that the smart aircraft may be communicating with it based on the first notification information. Based on the first notification information, the communication device to be switched to may make an adjustment, such as reserving a sufficient amount of response time, reserving a communication channel in advance, or configuring one or more of the configurations to ensure the smart aircraft may establish a high quality and a high efficiency communication connection with the communication device to be switched to. In addition, the first notification information may include current communication information of the smart aircraft, such as a communication volume of the currently connected communication device, a flight speed of the smart aircraft, etc. in order to reserve a sufficient amount of response time.

In one embodiment, when the process mentioned above is performed on the server side, the server may generate a second notification information when the server acquires that the smart aircraft may need to switch the communication device based on the location of the smart aircraft, an IoT sensor, or the like. The server may further transmit the second notification information to the smart aircraft and the communication device to be switched to. As such, the smart aircraft and the communication device to be switched to may be informed that the smart aircraft is about to communicate with the communication device to be switched to, based on the second notification information. Further, based on the second notification information, the communication device to be switched to may make an adjustment, such as reserving a sufficient amount of response time, reserving a communication channel in advance, or configuring one or more of the configurations to ensure the smart aircraft may establish a high quality and a high efficiency communication connection with the communication device to be switched to. Furthermore, based on the second notification information, the smart aircraft may also make an adjustment, such as reserving a sufficient amount of response time, reserving a communication channel in advance, or configuring one or more of the configurations. In addition, the second notification information may include a response time that may need to be reserved, which may be determined based on the current communication information of the smart aircraft (e.g., a communication volume of the currently connected communication device, a flight speed of the smart aircraft, etc.).

In one embodiment, the resource scheduling of the communication connection may be determined based on the information priority level of the communication, and specifically, based on the level of the information that may need to be communicated, determine whether it may be necessary to reserve a corresponding communication resource for a particular level of information. More specifically, communication resources may be always reserved information with a high level. For example, communication resources may be reserved for emergency numbers such as 119, 110, 120, etc. for the communication of information to ensure the smoothness and quality of the channel.

In some embodiment, the communication method may further include determining the resource scheduling of the communication connection based on a location of a real-time route when a real-time route deviates from a planned route. More specifically, the resource scheduling of the communication connection may be determined based on the location of the real-time route. In some embodiments, the resource scheduling of the communication connection may be determined based on the location of real-time route and the location of the destination. More specifically, the movement route information may be re-estimated or re-planned based on the location of the real-time route and the location of the destination, and the resource scheduling of the communication connection may be determined based on the re-estimated or re-planned movement route information. In other embodiments, the resource scheduling of the communication connection may also be determined based on the location of the real-time route and the environment information nearby the location.

The following is an example of performing the process mentioned above on the terminal side. Using a smart car as an example, when the smart car is travelling along a planned route, a section of the planned route may not be accessible (due to traffic control, road work, etc.). At this point, the smart car may need to bypass the section (the communication with the communication device that the smart car may have established the communication connection may be interrupted during this time). When the smart car deviates from the planned route, a sixth processor on the smart car may re-determine the movement route information based on the current location of the smart car and the location of the destination, and re-determine the resource scheduling of the communication connection. Further, the sixth processor on the smart car may transmit a third communication connection instruction to establish a communication connection with an IoT sensor, a communication base station, a camera with a communication function, and other communication devices that may realize IoT connections nearby the current location. When the communication connection is established with the communication device nearby the current location, information of other communication devices along a newly planned movement route may be acquired through the communication device nearby the current location. The sixth processor may further plan the new movement route based on the acquired information and re-determine the resource scheduling of the communication connection based on information of the IoT devices. As such, a rational scheduling of the resources for the communication connection may be realized, high quality communication may be ensured, and user requirements may be met while saving resources.

In one embodiment, when the process mentioned above may be performed on the server side. When the smart car deviates from the planned route (the communication with the communication device that the smart car may have established the communication connection may be interrupted during this time), the location of the smart car may be detected by an IoT sensor or a camera having a communication function nearby the smart car's current location, and transmit the information of the smart car to the server. As such, the server may obtain the location of the smart current. Further, the location of the smart car may be obtained based on the positioning of the smart car, which is not specifically limited herein. In addition, information of the IoT sensor, the communication base station, the camera with a communication function, and other communication devices that may realize IoT connections nearby the current location may be acquired, and a fourth communication connection instruction may be transmitted to the smart car and the communication devices nearby the smart car. As such, a communication connection may be established between the smart car and the communication devices nearby the smart car that received the fourth communication connection instruction. Further, information related to the smart car may be obtained through the communication devices nearby the smart car, and after the communication connection is established, the re-planned movement route information may be transmitted to the smart car and the corresponding communication device in the re-planned movement route information. As such, a rational scheduling of the resources for the communication connection may be realized, high quality communication may be ensured, and user requirements may be met while saving resources.

Figure 2:
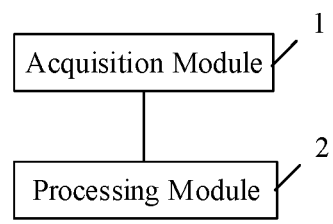
FIG. 2 is a block diagram of an electronic device according to an embodiment of the present disclosure.

As shown in FIG. 2, the present disclosure further provides an electronic device. The electronic device may include:

An acquisition module 1 that may be used to acquire pre-estimated or pre-planned movement route information.

A processing module 2 that may be used to determine a resource scheduling of a communication connection based on the pre-estimated or pre-planned movement route information.

In some embodiments, determine the resource scheduling of the communication connection by using the processing module 2 may include: determine a channel resource to be used or reserved; or determining a cell switch scheme.

In some embodiments, determine the resource scheduling of the communication connection by using the processing module 2 may include: determine a communication device to be connected in a group of communication devices.

In some embodiments, determine the resource scheduling of the communication connection by using the processing module 2 may include: determine the resource scheduling of the communication connection based on one or more of an operational state of the communication device, an amount of information to be communicated, or an information priority level of the communication.

In some embodiments, the processing module 2 may further be used to determine the resource scheduling of the communication connection based on a location of a real-time route acquired by the acquisition module 1 when the real-time route deviates from a planned route.

Figure 3:
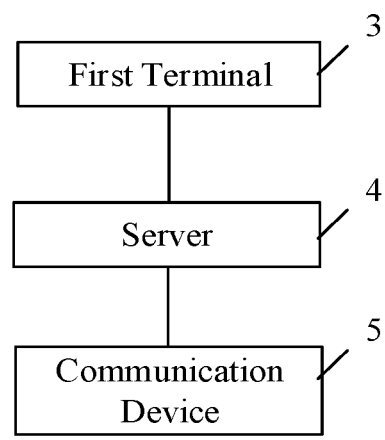
FIG. 3 is a block diagram of a communication system according to an embodiment of the present disclosure.

As shown in FIG. 3, the present disclosure further provides a communication device. The communication device may include:

A first terminal 3 that may be used to acquire pre-estimated or pre-planned movement route information.

A server 4 that may be used to determine a resource scheduling of a communication connection based on the pre-estimated or pre-planned movement route information.

In some embodiments, determine the resource scheduling of the communication connection by using the first terminal 3 may include: determine a channel resource to be used or reserved; or determining a cell switch scheme.

In some embodiments, determine the resource scheduling of the communication connection by using the server 4 may include: determine a communication device 5 to be connected in a group of communication devices.

In some embodiments, determine the resource scheduling of the communication connection by using the server 4 may include: determine the resource scheduling of the communication connection based on one or more of an operational state of the communication device, an amount of information to be communicated, or an information priority level of the communication.

In some embodiments, the first terminal 3 may further be used to determine the resource scheduling of the communication connection based on a location of a real-time route acquired by the server 4 when the real-time route deviates from a planned route.

The electronic device and the communication system described in the embodiments may be the electronic device and communication system corresponding to the communication method provided in the embodiments of the present disclosure. A person skilled in the art may understand the specific embodiments of the electronic device, the communication system, and various modifications thereof provided in the embodiments of the present disclosure based on the communication method provided in the embodiment of the present disclosure. Therefore, the electronic device and communication system will not be described in detail herein. The electronic device and the communication system that implement the communication method provided in the embodiment of the present disclosure by those skilled in the art may all be within the scope of the present disclosure.

A person skilled in the art should understand that the embodiments of the present disclosure may be provided as a method, a system, or a computer program product. Therefore, the present application may adopt a form of hardware only embodiments, software only embodiments, or embodiments in combination of software and hardware. Moreover, the present application may adopt a form of a computer program product that is implemented on one or more computer usable storage media (including but not limited to a disk memory, a CD-ROM, an optical memory, and the like) that include computer usable program code.

The present disclosure is described with reference to the flowcharts and/or block diagrams of the method, the device (system), and the computer program product according to the embodiments of the present application. It should be understood that computer program instructions may be used to implement each process and/or each block in the flowcharts and/or the block diagrams and a combination of a process and/or a block in the flowcharts and/or the block diagrams. These computer program instructions may be provided to a general-purpose computer, a dedicated computer, an embedded processor, or a processor of any other programmable data processing device to generate a machine, so that the instructions executed by a computer or a processor of any other programmable data processing device generate an apparatus for implementing a specific function in one or more processes in the flowcharts and/or in one or more blocks in the block diagrams.

These computer program instructions may also be stored in a computer readable memory that can instruct the computer or any other programmable data processing device to work in a specific manner, so that the instructions stored in the computer readable memory generate an artifact that includes an instruction apparatus. The instruction apparatus implements a specific function in one or more processes in the flowcharts and/or in one or more blocks in the block diagrams.

These computer program instructions may also be loaded onto a computer or another programmable data processing device so that a series of operations and steps are executed on the computer or the other programmable device so as to generate computer-implemented processing. Thereby, the instructions executed on the computer or the other programmable device provide steps for implementing a specific function in one or more processes in the flowcharts and/or in one or more blocks in the block diagrams.

The above examples are only exemplary embodiments of the present disclosure and are not intended to limit the scope of the disclosure, which is defined by the claims. It is contemplated that various modifications and equivalent replacements may be made to the disclosure within the essence and protection scope thereof, and such modifications and replacements may be regarded as falling in the protection scope of the disclosure.

What is claimed is:

1. A communication method, comprising:
acquiring, by a server, route information of a planned route of a mobile device, the route information including a destination;
determining, by the server, a resource scheduling of a communication connection of the mobile device based on the route information of the planned route, including:
  determining, from a group of communication devices, a first communication device to be connected for a first portion of the planned route and a second communication device to be connected for a second portion of the planned route different from the first portion, the communication connection of the mobile device including a communication connection with the first communication device or a communication connection with the second communication device; and
  determining the resource scheduling of the communication connection of the mobile device based on a configuration of the first communication device and a configuration of the second communication device, including:
    determining a response time needed for the second communication device to establish the communication connection based on the configuration of the second communication device and transmitted data parameters of the second communication device;
    reserving a channel resource of the first communication device and a channel resource of the second communication device for the communication connection of the mobile device; and
    determining a switch scheme for the mobile device to switch from the communication connection with the first communication device to the communication connection with the second communication device, the switch scheme including, in response to the mobile device moving from the first portion of the planed route to the second portion of the planned route:
      establishing the communication connection with the second communication device using the reserved channel resource of the second communication device; and
      after a period of time equaling the response time since the communication connection between the mobile device and the second communication device is established, disconnecting the communication connection with the first communication device;
receiving, by the server, environment information detected in real time by one or more sensors disposed on the planned route; and
adjusting, by the server, the resource scheduling of the communication connection of the mobile device based on the environment information.

2. The method of claim 1, wherein determining the resource scheduling of the communication connection of the mobile device further comprises:
determining the resource scheduling of the communication connection of the mobile device based on at least one of an operational state of the first communication device, an operational state of the second communication device, an amount of information to be communicated, or an information priority level of the communication connection.

3. The method of claim 1, further comprising:
in response to a real-time route of the mobile device deviating from the planned route, determining the resource scheduling of the communication connection of the mobile device based on a location of the real-time route.

4. The method of claim 1, wherein determining the resource scheduling of the communication connection of the mobile device further includes:
determining the resource scheduling of the communication connection of the mobile device based on an amount of information to be communicated or an information priority level of the communication connection.

5. An electronic device comprising:
a memory storing a computer program; and
a processor configured to execute the computer program to:
  acquire route information of a planned route of a mobile device, the route information including a destination;
  determine a resource scheduling of a communication connection with the mobile device based on the route information of the planned route, including:
    determining, from a group of communication devices, a first communication device to be connected for a first portion of the planned route and a second communication device to be connected for a second portion of the planned route different from the first portion, the communication connection of the mobile device including a communication connection with the first communication device or a communication connection with the second communication device; and
    determining the resource scheduling of the communication connection of the mobile device based on a configuration of the first communication device and a configuration of the second communication device, including:
      determining a response time needed for the second communication device to establish the communication connection based on the configuration of the second communication device and transmitted data parameters of the second communication device;
      reserving a channel resource of the first communication device and a channel resource of the second communication device for the communication connection of the mobile device; and
      determining a switch scheme for the mobile device to switch from the communication connection with the first communication device to the communication connection with the second communication device, the switch scheme including, in response to the mobile device moving from the first portion of the planed route to the second portion of the planned route:
        establishing the communication connection with the second communication device using the reserved channel resource of the second communication device; and
        after a period of time equaling the response time since the communication connection between the mobile device and the second communication device is established, disconnecting the communication connection with the first communication device;

receive environment information detected in real time by one or more sensors disposed on the planned route; and adjust the resource scheduling of the communication connection of the mobile device based on the environment information.

6. The electronic device of claim 5, wherein the processor is further configured to execute the computer program to determine the resource scheduling of the communication connection based on at least one of an operational state of the first communication device, an operational state of the second communication device, an amount of information to be communicated, or an information priority level of the communication connection.

7. The electronic device of claim 5, wherein the processor is further configured to execute the computer program to:
in response to a real-time route of the mobile device deviating from the planned route, determine the resource scheduling of the communication connection based on a location of the real-time route.

8. The electronic device of claim 7, wherein the processor is further configured to execute the computer program to update the route information based on the location of the real-time route.

9. The electronic device of claim 8, wherein the processor is further configured to execute the computer program to update the route information based on an updated location of the destination.

10. The electronic device of claim 5, wherein the processor is further configured to execute the computer program to determine the resource scheduling of the communication connection of the mobile device based on an amount of information to be communicated or an information priority level of the communication connection.

11. A communication system, comprising:
a terminal configured to acquire route information of a planned route of a mobile device, the route information including a destination; and
a server communicatively coupled to the terminal, the server being configured to:
determine a resource scheduling of a communication connection of the terminal with the mobile device based on the route information of the planned route, including:
determining, from a group of communication devices, a first communication device to be connected for a first portion of the planned route and a second communication device to be connected for a second portion of the planned route different from the first portion, the communication connection of the mobile device including a communication connection with the first communication device or a communication connection with the second communication device; and
determining the resource scheduling of the communication connection of the mobile device based on a configuration of the first communication device and a configuration of the second communication device, including:
determining a response time needed for the second communication device to establish the communication connection based on the configuration of the second communication device and transmitted data parameters of the second communication device;
reserving a channel resource of the first communication device and a channel resource of the second communication device for the communication connection of the mobile device; and
determining a switch scheme for the mobile device to switch from the communication connection with the first communication device to the communication with the second communication device, the switch scheme including, in response to the mobile device moving from the first portion of the planed route to the second portion of the planned route:
in response to the mobile device moving along the first portion of the planned route, establishing the communication connection between the mobile device and the first communication device using the reserved channel resource of the first communication device; and
establishing the communication connection with the second communication device using the reserved channel resource of the second communication device; and
after a period of time equaling the response time since the communication connection between the mobile device and the second communication device is established, disconnecting the communication connection with the first communication device;
receive environment information detected in real time by one or more sensors disposed on the planned route; and
adjust the resource scheduling of the communication connection of the mobile device based on the environment information.

12. The communication system of claim 11, wherein the server is further configured to determine the resource scheduling of the communication connection based on an operational state of the first communication device, an operational state of the second communication device, an amount of information to be communicated, or an information priority level of the communication connection.

13. The communication system of claim 11, wherein the server is further configured to:
in response to a real-time route of the mobile device deviating from the planned route, determine the resource scheduling of the communication connection based on a location of the real-time route.

14. The communication system of claim 13, wherein the server is further configured to update the route information based on the location of the real-time route or an updated location of the destination.

15. The communication system of claim 11, wherein the server is further configured to determine the resource scheduling of the communication connection based on an amount of information to be communicated, or an information priority level of the communication connection.

* * * * *